United States Patent Office 3,801,574
Patented Apr. 2, 1974

3,801,574
OXAZINOQUINAZOLINONES
David B. Reisner, Hightstown, Bernard J. Ludwig, North Brunswick, and Frank M. Berger, Princeton, N.J., assignors to Carter-Wallace, Inc., New York, N.Y.
No Drawing. Filed June 19, 1972, Ser. No. 264,312
Int. Cl. C07d 87/04
U.S. Cl. 260—244 R          16 Claims

ABSTRACT OF THE DISCLOSURE

Chemical compounds of the formula:

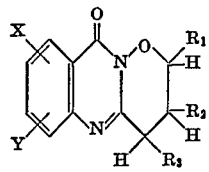

Wherein X and Y each represent a member selected from the group consisting of hydrogen, halogen or lower alkyl and each R is selected from the group consisting of hydrogen and lower alkyl. The compounds have valuable anti-inflammatory activity in standard laboratory animals.

The present invention relates to novel chemical compounds. More particularly, the invention relates to novel compounds which possess pharmacologically useful anti-inflammatory properties.

The oxazinoquinazolinone compounds of the present invention have the following general chemical structure:

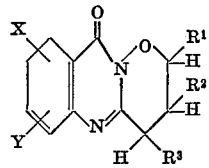

wherein X and Y each represent a member selected from the group consisting of hydrogen, halogen or lower alkyl and each R is selected from the group consisting of hydrogen and lower alkyl. As used herein the term "lower alkyl" signifies alkyl radicals having from 1-6 carbon atoms. These compounds can exist and can be used in the form of the free base or an acid addition salt thereof with a pharmacologically acceptable acid such as hydrochloric, phosphoric, sulfuric, tartaric, and the like.

The compounds of the invention can be conveniently prepared by reacting an appropriate alkyl anthranilate with a suitable 4-halogenoalkanoic acid halide in the presence of an acid acceptor. The resulting amide-ester is then reacted with hydroxylamine hydrochloride in the presence of alkali to obtain the desired compounds. The reactions involved are as follows:

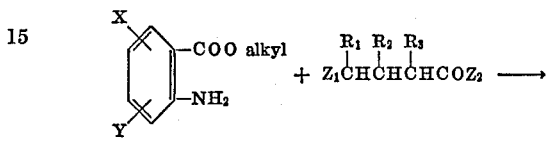

wherein each R is hydrogen or lower alkyl and each Z is chlorine or bromine.

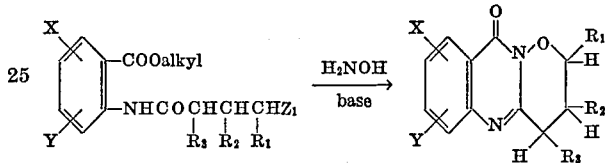

The ester of the substituted anthranilic acid is prepared by (1) reacting the acid with an alcohol in the presence of sulfuric acid or hydrochloric acid or (2) reacting the appropriate isatoic anhydride with an alcohol in the presence of a strong base. The 4-halogenoalkanoic acid halide is prepared by the reaction of a 4-halogenoalkanoic acid with thionyl chloride or a phosphorus halide or by the reaction of an appropriately substituted γ-butyrolactone with thionyl chloride in the presence of zinc chloride.

Table 1 and the examples which follow set forth the physical constants of a representative number of the novel compounds and the examples which follow illustrate methods of preparation respectively. These are in no event to be construed as limiting.

TABLE 1

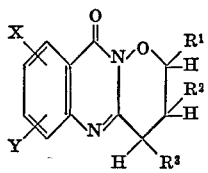

| Cpd. No. | X and Y | $R^1$ | $R^2$ | $R^3$ | Recryst. solvent | M.P., °C. | Formula | Carbon Calcd. | Carbon Found | Hydrogen Calcd. | Hydrogen Found | Nitrogen Calcd. | Nitrogen Found | Other elements Calcd. | Other elements Found |
|---|---|---|---|---|---|---|---|---|---|---|---|---|---|---|---|
| 1 | H | H | H | H | EtOAc | 161–162 | $C_{11}H_{10}N_2O_2$ | 65.33 | 65.14 | 4.98 | 5.03 | 13.86 | 13.77 | [1] 15.83 | 16.05 |
| 2 | 8-Cl | H | H | H | EtOH | 155–157 | $C_{11}H_9ClN_2O_2$ | 55.83 | 56.01 | 3.83 | 3.75 | 11.84 | 11.94 | [2] 14.98 | 14.87 |
| 3 | H | $CH_3$ | H | H | EtOAc | 167–171 | $C_{12}H_{12}N_2O_2$ | 66.65 | 66.47 | 5.59 | 5.48 | 12.96 | 12.76 | | |
| 4 | 8-$CH_3$ | H | H | H | EtOH | 135–136 | $C_{12}H_{12}N_2O_2$ | 66.65 | 66.80 | 5.59 | 5.52 | 12.96 | 12.98 | | |
| 5 | H | H | $CH_3$ | H | (i-Pr)$_2$O | 91–93 | $C_{12}H_{12}N_2O_2$ | 66.65 | 66.42 | 5.59 | 5.45 | 12.96 | 13.08 | | |
| 6 | H | H | H | $CH_3$ | EtOAc-EtOH | 159–162 | $C_{12}H_{12}N_2O_2$ | 66.65 | 66.40 | 5.59 | 5.52 | 12.96 | 12.77 | | |
| 7 | 6,8-diCl | H | H | H | Trichlor | [3] 212 | $C_{11}H_8Cl_2N_2O_2$ | 48.73 | 48.73 | 2.97 | 2.95 | 10.33 | 10.28 | [2] 26.15 | 26.18 |

[1] Oxygen.  [2] Chlorine.  [3] Decomposition.

EXAMPLE 1

Preparation of 3,4-dihydro-(1,2)-oxazino[3,2-b]quinazolin-10(2H)-one

A solution of 129 g. (0.85 mole) of methyl anthranilate in 350 ml. of pyridine was cooled to 0° C., and 120 g. (0.85 mole) of 4-chlorobutyryl chloride was added dropwise to the stirred solution. The reaction mixture was stirred at room temperature overnight. The pyridine was removed by distillation under reduced pressure, water was added and the mixture was extracted with chloroform. The chloroform solution was dried over Drierite and evaporated to dryness to yield 216 g. of an oil. The oil was treated with petroleum ether and allowed to crystallize. The crude product was separated by filtration and used in the following reaction without further purification.

To a stirred solution of 102 g. (2.6 moles) of sodium hydroxide and 119 g. (1.7 moles) of hydroxylamine hydrochloride in 300 ml. of water cooled at 0° C., was added a solution of the above crude intermediate dissolved in 150 ml. of ethanol. The rate of addition was adjusted to maintain a reaction temperature of 0 to 20° C. The resulting solution was stirred at room temperature overnight. The alcohol was removed by distillation and the mixture was extracted with 400 ml. of chloroform. The chloroform solution was washed with water, dried over Drierite and concentrated to dryness. The oil (100 g.) which crystallized on standing was washed with ether and recrystallized from ethyl acetate giving 59.9 g. of 3,4-dihydro-(1,2)-oxazino[3,2-b]quinazolin-10(2H)-one.

EXAMPLE 2

Preparation of 2-methyl-3,4-dihydro-(1,2)-oxazino-[3,2-b]quinazolin-10(2H)-one

A mixture of 100 g. of γ-valerolactone, 100 ml. of thionyl chloride and 0.5 g. of zinc chloride was heated on a steam bath overnight and then distilled at 83–85° C. and approximately 20 mm. giving 60.9 g. of 4-chlorovaleryl chloride. The acid chloride was allowed to react with methyl anthranilate, and the resulting intermediate was treated with hydroxylamine as described in Example 1.

EXAMPLE 3

Preparation of 4-methyl-3,4-dihydro-(1,2)-oxazino-[3,2-b]quinazolin-10(2H)-one 4-chloro-2-methylbutyryl chloride (B.P. 75–78° C. at approximately 15 mm.) prepared from 2-methyl-γ-butyrolactone according to the method detailed in Example 2 was allowed to react with methyl anthranilate and hydroxylamine according to the method described in Example 1.

EXAMPLE 4

Preparation of 3-methyl-3,4-dihydro-(1,2)-oxazino-[3,2-b]quinazolin-10(2H)-one 80 g. of the methyl half ester of 3-methylglutaric acid (Linstead, Lunt and Weedon, J. Chem. Soc. 1950, 3331) was converted to methyl 4-bromo-3-methylbutyrate as described by Marks and Polgar, J. Chem. Soc. 1955, 3854. 40 g. of the bromoester was hydrolyzed to the corresponding acid with a solution of 48% hydrogen bromide in 90% aqueous acetic acid. The bromoacid (22 g.) was then converted to 4-bromo-3 methylbutyryl chloride and the latter was treated with methyl anthranilate followed by hydroxylamine according to the method given in Example 1.

EXAMPLE 5

Preparation of 8-chloro-3,4-dihydro-(1,2)-oxazino-[3,2-b]quinazolin-10(2H)-one

Methyl 5-chloro-2-(4-chlorobutyramido)benzoate (107 g.), obtained from 71 g. of methyl 5-chloroanthranilate and 54 g. of 4-chlorobutyryl chloride, was treated with 51.5 g. of hydroxylamine hydrochloride and 44.4 g. of sodium hydroxide. The crude product, an oil, was dissolved in ethanol and dry hydrogen chloride was added. The solid hydrochloride was removed by filtration and was converted to the free base with aqueous sodium hydroxide. The base was extracted into chloroform and the organic solution was dried and concentrated to dryness giving 35.2 g. of a solid which was recrystallized from ethanol.

EXAMPLE 6

Preparation of 8-methyl-3,4-dihydro-(1,2)-oxazino-[3,2-b]quinazolin-10(2H)-one 38 g. of Compound 4 in Table 1 was obtained from 86.3 g. of methyl 5-methylanthranilate, 75 g. of 4-chlorobutyryl chloride and 65.5 g. of hydroxylamine hydrochloride according to the procedure given in Example 5.

EXAMPLE 7

Preparation of 6,8-dichloro-3,4-dihydro-(1,2)-oxazino-[3,2-b]quinazolin-10(2H)-one 4.6 g. of Compound 7 in Table 1 was obtained from 30.5 g. of methyl 3,5-dichloroanthranilate, 19.7 g. of 4-chlorobutyryl chloride and 19.2 g. of hydroxylamine hydrochloride according to the procedure detailed in Example 1.

EXAMPLE 8

Preparation of 3,4-dihydro-(1,2)-oxazino[3,2-b]quinazolin-10(2H)-one hydrochloride A sample of the base, 3,4-dihydro-(1,2)-oxazino[3,2-b]quinazolin-10(2H)-one, was added to a heated solution of hydrogen chloride in ethanol. The resulting mixture was allowed to cool to room temperature and filtered to remove the desired hydrochloride of 3,4-dihydro-(1,2)-oxazino[3,2-b]quinazolin-10(2H)-one. The salt melted with decomposition at 273° C.

*Analysis.*—Calcd. for $C_{11}H_{11}ClN_2O_2$ (percent): C, 55.36; H, 4.65; Cl, 14.85; N, 11.74. Found (percent): C, 55.39; H, 4.72; Cl, 14.70; N, 11.85.

The compounds of the present invention are useful as a result of their valuable pharmacological properties, for example, they are valuable anti-inflammatory agents, as evidenced by their ability to inhibit the local edema formation characteristic of inflammatory states when administered systemically to warm-blooded animals.

The procedure described below (Winters et al., Proc. Soc., Exp. Biol. Med., 111, 544, 1962) was used to establish the effectiveness of these compounds in the hind paw edema induced by carrageenin in the rat. This procedure is considered suitable for demonstrating anti-inflammatory activity of drug compounds in laboratory animals.

Male rats of the Sprague-Dawley strain (Charles River Laboratories) weighing 100±20 grams were used for this study. Six animals were used for each drug dose. The drug was suspended in 1 percent aqueous solution of gum acacia, and each rat received 10 ml./kg. of the appropriate concentration of drug suspension by oral intubation; controls were given a similar volume of the vehicle. One hour later, edema in the right hind paw was induced by the subplantar injection of 0.05 ml. of 1 percent calcium carrageenin dissolved in 0.15 N sodium chloride. The volume of the foot was determined immediately and again 3 hours later. The difference was recorded as edema volume. Foot volume was measured by immersion of the foot in water at the level of the lateral malleolus, and determining the volume of water displaced by the foot. The $ED_{50}$ may be defined as the dose in which edema formation is inhibited by 25 percent or more in 50 percent of the rats when compared to the mean value of the controls.

When tested by the method set forth above, the Compound No. 1 of Table 1, 3,4-dihydro-(1,2)-oxazino[3,2-b]quinazolin-10(2H)-one was found to have an $ED_{50}$ value of 40±23 mg./kg. of animal weight.

The pharmaceutical compositions of the present invention are prepared by incorporating the active ingredient with a suitable pharmaceutical carrier. The carrier must be of such nature that the novel compositions may be administered systemically to warm-blooded animals. The term "systemically" as used herein, means a mode of administration whereby the active ingredient, when given to warm-blooded animals, is effective in the whole body and not merely at the locus of application. This included parenteral and other methods of administration.

The active ingredients of the present invention are preferably administered orally in the form of tablets or capsules. Suitable solid pharmaceutical carriers which can be utilized include, for example, starch, lactose, sucrose, glucose, gelatin, and the like. When the composition is in the form of a solid, the active ingredient is generally in the amount of from about 25 to about 95 percent by weight of the total composition.

The active ingredients of the invention can also be dissolved in a liquid pharmaceutical carrier, such as, for example, propylene glycol, polyethylene glycol, water, saline, and mixtures thereof, to form a solution suitable for injection. Such injectable solutions generally contain from about 0.05 gram to about 30 grams of active ingredient per 100 ml. of solution.

What is claimed is:

1. A compound selected from the group consisting of compounds of the formula:

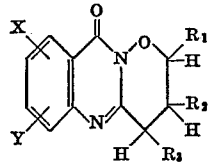

and the physiologically acceptable acid addition salts thereof wherein X and Y are each a member selected from the group consisting of hydrogen, halogen or lower alkyl and each R is selected from the group consisting of hydrogen and lower alkyl.

2. A compound of claim 1 wherein X, Y, $R_1$, $R_2$ and $R_3$ are each hydrogen.
3. A compound of claim 1 wherein X is halogen and Y, $R_1$, $R_2$ and $R_3$ are hydrogen.
4. A compound of claim 1 wherein $R_1$ is lower alkyl and X, Y, $R_1$, $R_2$, and $R_3$ are hydrogen.
5. A compound of claim 1 wherein X is lower alkyl and Y, $R_1$, $R_2$ and $R_3$ are hydrogen.
6. A compound of claim 1 wherein $R_2$ is lower alkyl and X, Y, $R_1$ and $R_3$ are hydrogen.
7. A compound of claim 1 wherein $R_3$ is lower alkyl and X, Y, $R_1$ and $R_2$ are hydrogen.
8. A compound of claim 1 wherein X and Y are halogen and $R_1$, $R_2$ and $R_3$ are hydrogen.
9. 2-methyl - 3,4 - dihydro-(1,2)-oxazino[3,2-b]quinazolin-10(2H)-one.
10. 4 - methyl-3,4-dihydro-(1,2)-oxazino[3,2-b]-quinazolin-10(2H)-one.
11. 3,4-dihydro - (1,2) - oxazino[3,2-b]quinazolin-10 (2H)-one.
12. 3-methyl - 3,4 - dihydro-(1,2)-oxazino[3,2-b]quinazolin-10(2H)-one.
13. 8-chloro-3,4-dihydro - (1,2) - oxazino[3,2-b]quinazolin-10(2H)-one.
14. 8-methyl-3,4-dihydro - (1,2) - oxazino[3,2-b]quinazolin-10(2H)-one.
15. 6,8-dichloro-3,4-dihydro - (1,2) - oxazino[3,2-b] quinazolin-10(2H)-one.
16. 3,4-dihydro - (1,2) - oxazino[3,2-b]quinazolin-10 (2H)-one hydrochloride.

References Cited
UNITED STATES PATENTS
3,684,805   8/1972   Reisner et al. _____ 260—244

HARRY I. MOATZ, Primary Examiner

U.S. Cl. X.R.

260—471 R; 424—248